July 29, 1952
F. Y. GREPE
2,605,454
DYNAMIC BRAKING OF ELECTRIC MOTORS
Filed Feb. 7, 1949
2 SHEETS—SHEET 1
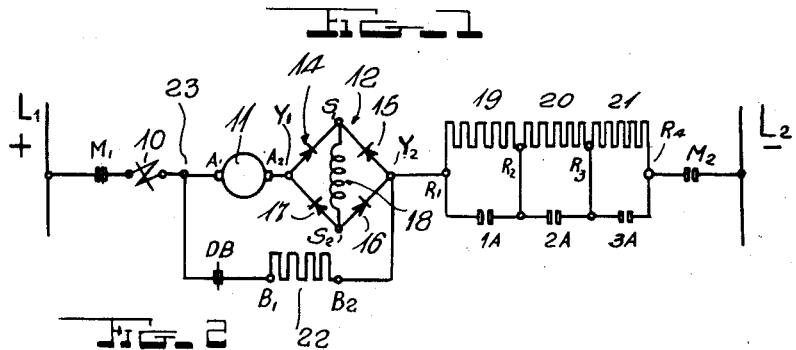
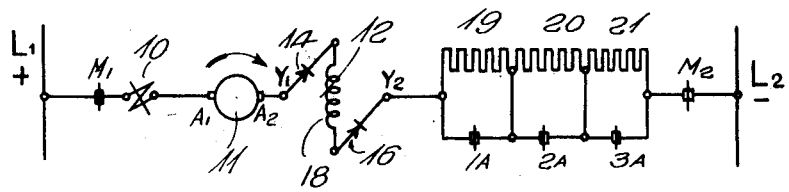
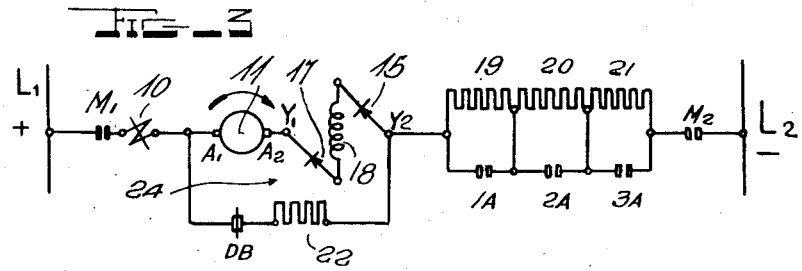
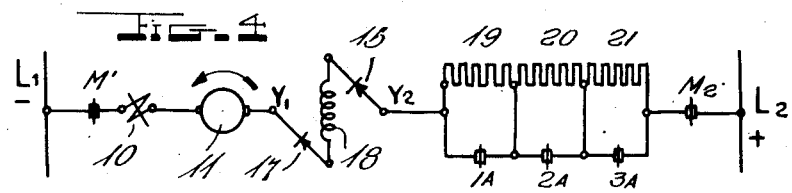
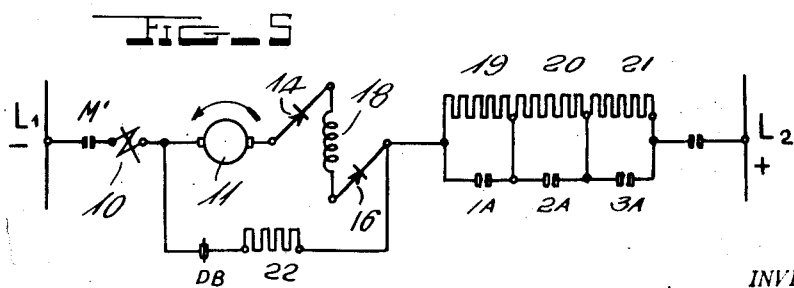
INVENTOR.
Frederick Y. Grepe
BY
John B. Brady
ATTORNEY

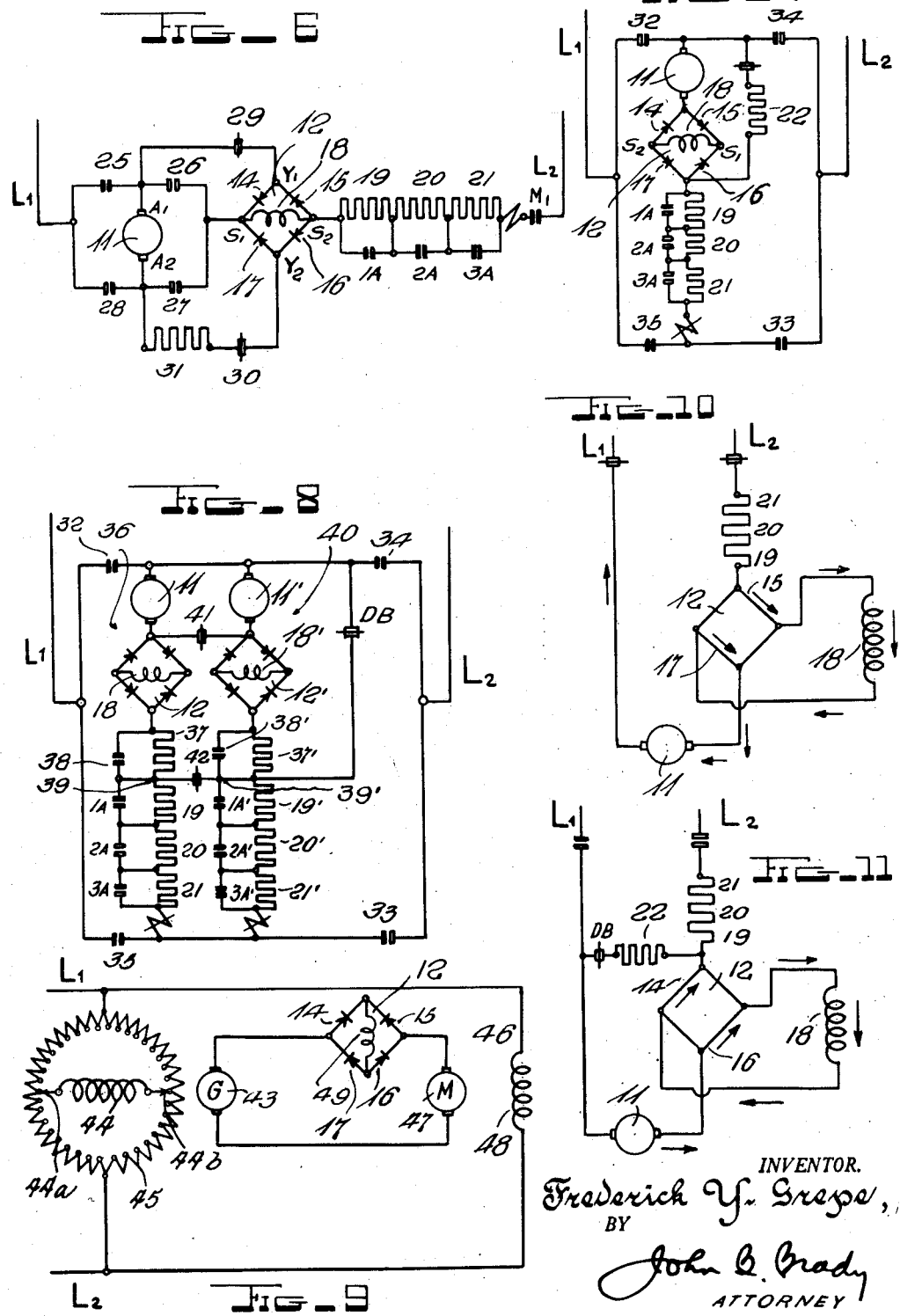

Patented July 29, 1952

2,605,454

UNITED STATES PATENT OFFICE 2,605,454

DYNAMIC BRAKING OF ELECTRIC MOTORS

Frederick Y. Grepe, Toronto, Ontario, Canada, assignor to Canadian Controllers, Limited, Toronto, Ontario, Canada Application February 7, 1949, Serial No. 75,047
In Canada January 31, 1949

5 Claims. (Cl. 318—380)

My invention relates broadly to the dynamic breaking of electric motors, and more particularly to an improved method of circuit arrangement for the dynamic braking of series wound motors.

One of the objects of my invention is to provide an improved method of circuit arrangement for the dynamic braking of series wound electric motors employing terminally connected unilateral conducting means in circuit with the field of the motor and associated with an external circuit whereby upon opening of the power supply line to the motor a braking torque is automatically applied by the motor.

Another object of my invention is to provide a system for readily reversing the direction of rotation of series wound motors employing only two wires leading to the motor and eliminating the necessity for a multiplicity of collector rails with incidental multiple contacts required in conventional reversing systems.

Still another object of my invention is to provide a system of dynamic braking for a series wound motor by a simplified arrangement of remotely located spring closed contactor and dynamic braking resistor.

A further object of my invention is to provide a circuit arrangement for effecting the dynamic braking of a series wound motor in either direction by the employment of a remotely located spring closed contactor and dynamic braking resistor.

A still further object of my invention is to provide a dynamic braking system for a series wound motor which is instantly effective in the event that a load or an external force may tend to turn the motor in either direction.

Still another object of my invention is to provide an improved method and circuit arrangement for series wound motors in which both service and emergency dynamic braking may be effective in either direction with equal facility and with identically the same equipment.

A still further object of my invention is to provide a circuit arrangement which makes it possible to use series wound or compound wound motors in variable voltage or Ward-Leonard systems.

Other and further objects of my invention reside in an improved method of obtaining dynamic braking of series wound motors selectively employing either of two unilateral terminally connected control paths in the motor circuit which are separately effective in a starting and running condition on the one hand, and a retarding and braking condition on the other hand, for effecting dynamic braking without the employment of movable contactors at the motor position but employing a spring closed contactor and dynamic braking resistor in a remote position, as set forth more fully in the specification hereinafter following, by reference to the accompanying drawings, in which:

Figure 1 is a circuit diagram of a non-reversing series wound electric motor provided with service and emergency dynamic braking according to my invention; Fig. 2 represents the starting and running condition of the series wound motor circuit illustrated in Fig. 1 with polarity shown for the production of driving torque in a clockwise direction; Fig. 3 illustrates the retarding and dynamic braking condition of the motor circuit illustrated in Fig. 1; Fig. 4 is a diagrammatic showing of the circuit of Fig. 1 with polarity reversed for a starting and running condition in driving the motor in a counter-clockwise direction; Fig. 5 illustrates the circuit of Fig. 1 for a retarding and dynamic braking condition with the motor rotating in a counter-clockwise direction; Fig. 6 shows a modified circuit arrangement for reversing a series wound motor for operation in either direction with dynamic braking provided in either direction; Fig. 1 shows a further modified form of circuit arrangement for reversing a series wound motor with dynamic braking provided in either direction; Fig. 8 shows the application of the principles of my invention in a circuit employing two series wound motors with reversing control and dynamic braking in either direction, and wherein service or emergency dynamic braking takes place if one motor fails and is cut out of the circuit; Fig. 9 illustrates the application of my invention to series wound or compound wound motors in a variable voltage or Ward-Leonard system; Fig. 10 is a diagram explaining the operation of the system of Fig. 1 for a starting and running condition of the circuit of my invention; and Fig. 11 is a diagram explaining the operation of the system of Fig. 1 for a retarding and dynamic braking condition of the circuit.

My invention is directed to an improved method of circuit arrangement for controlling series wound electric motors and automatically effecting dynamic braking thereof where only two wires lead to the motor from the motor control panel, thereby reducing installation complications encountered in such systems as cranes and ingot buggies where motors must be controlled through collector rails and sliding shoes on a crane bridge. The control equipment in the system of my invention is located at the control panel and a pair of wires extended therefrom to the collector rails from which slideable pickup is established to the motor carried by a crane bridge, for example. The method and circuit of my invention has proven highly effective in the rapid dynamic braking of electrical motors. The dynamic braking of crane motors is highly important. Failure to dynamically brake a series wound motor was one of the contributing factors in the loss of a large outdoor crane installation where excessive winds actually forced into motion a crane bridge along the elevated rail system. The crane bridge gathered momentum and was blown to the end of the elevated rail system and where its momentum was so great that it toppled the elevated rail supports with the resulting loss of the entire crane. With the dynamic braking circuit installed in the motor system of such a crane, movement of the crane by an external force would have been opposed and retarded by the operation of the dynamic braking circuit of my invention, thereby saving the crane. The circuit of my invention, provides for current flow to the series wound field of the series wound motor always in the same direction both in starting and running condition as well as in a stopping and braking condition. A voltage is produced across the armature under conditions of stopping and braking which in turn forces current through the field and armature so producing a braking torque. I provide for this condition by arranging a pair of unilateral circuit paths in electrical connection with the field of the motor where one of the paths is unidirectionally conductive during a starting and running condition for maintaining current through the field in the same direction. Voltage generated by the armature during the stopping and braking condition forces current through a closed loop provided around the armature and field, the magnitude of the current being dependent upon the speed at which the motor is turning and the resistance of the entire circuit. The torque produced by a motor is the product of the field strength and the armature strength and by this product a high braking torque can be obtained. The system of my invention employs a unilateral circuit which controls the effect of the field with respect to the armature. I provide a unidirectional switch in circuit with the field and armature so that as the torque of the motor falls off as the speed of the motor falls and the excitation or strength of the field falls off dependent on the shape of the saturation curve of the motor, the current generated by the armature decreases and is absorbed into a dead load in circuit with the armature and field whereby the energy generated is completely dissipated into the load and the motor strongly retarded. This is accomplished without mechanical switching at the motor position and wholly by a spring closed contactor and dynamic braking resistor at the control panel position and by the control exercised by the polarizing circuit at the motor position.

Referring to the drawings in more detail, L1 and L2 designate power supply lines leading to the series wound electric motor through contactors M1 and M2. In the arrangement illustrated I have designated line L1 as the positive side of the line and L2 as the negative side of the line. Contactor M1 connects through overload relay 10 with brush A1 of armature 11. The opposite brush A2 of armature 11 leads to the terminal Y1 of the directional switching circuit 12. The directional switching circuit 12 contains four unilateral conducting elements at 14, 15, 16, and 17. These unilateral conducting elements in the form of my invention illustrated are constituted by selenium plates having the inherent quality or characteristic of always passing current in the same direction. The directivity of the current in the several paths shown is in the direction of the arrows. At terminal Y1 connection is established with unilateral conductive element 14 and unilateral conductive element 17. Unilateral conductive element 14 leads to terminal S1 of the field winding 18. The terminal S1 connects to unilateral conductive element 15 to terminal Y2. The opposite terminal of field 18 is designated at S2 which connects through unilateral conductive element 16 with terminal Y2. Terminal Y2 connects through the series arranged resistors 19, 20 and 21 having taps R1, R2, R3 and R4 as shown. Taps R1 and R2 are bridged by contactor 1A. Taps R2 and R3 are bridged by contactor 2A. Taps R3 and R4 are bridged by contactor 3A. The resistant circuit connects to the main contactor M2 as shown and to the line L2.

I provide a path interconnecting the armature 11 with the field winding 18 which extends between brush A1 through the contactor DB to terminal B1 of resistance 22 and from terminal B2 of said resistance 22 to terminal Y2 of the directional switching circuit 12. The directional switching circuit 12 does not involve any movable electrical contactors and remains permanently fixed in its relation to the armature 11. Only two terminal connections are brought out from the motor in a crane installation for example, that is, terminal 23 leading to brush A1 and terminal Y2. The balance of the equipment, including the contactors, resistance 22 and the resistors 19, 20 and 21 with their associated sectionalizing contactors 1A, 2A and 3A are located in a remote control position on the control panel of the installation. Accordingly, terminals 23 and Y2 may connect to shoes which establish sliding connection with rails in a conventional crane installation.

In the starting and running condition contactors M1 and M2 are closed, contactor DB is opened and contactors 1A, 2A, and 3A are closed in sequence. To stop and brake the motor contactors M1, M2, 1A, 2A and 3A are open and contactor DB is closed. This may be accomplished by a spring closed contactor system which is electromagnetically remotely controlled for moving an armature to one limiting position for closing said contactors M1 and M2 and opening contactor DB, and closing contactors 1A, 2A and 3A in sequence for starting, while in the reverse position of the armature contactors M1 and M2 and 1A, 2A and 3A are open while contactor DB is closed. In order to clarify the operation of the circuit for starting I have illustrated in Fig. 2 the circuit elements which are effective during a starting and running condition, that is, the circuit may be traced from line L1 through contactor M1, overload relay 10, armature 11, unilateral conducting element 14, field winding 18, unilateral conducting element 16, and resistors 19, 20 and 21 through contactor M2 to line L2.

In stopping and dynamically braking the motor with contactors M1 and M2 open, a series path is provided from brush A1 of armature 11 through contactor DB, resistance 22, terminal Y2, unilateral conductive device 15, field winding 18, and unilateral conductive device 17, returning to brush A2 of armature 11. The spinning motor becomes a series wound generator under these conditions and the voltage generated by the armature 11 forces current through the closed loop which I have designated generally at 24 in Fig. 3, the magnitude of which depends upon the speed at which the motor is turning and the resistance of the entire circuit 24. Inasmuch as the torque produced by any motor is the product of the field strength and the armature strength, it can be seen that high braking torques can be obtained. However, the torque falls off as the speed falls and excitation or the force of the magnetic field 18 falls off dependent upon the saturation curve of the machine. The generated current dissipates into resistance 22 which constitutes an absorption load or a dead load absorbing the current or the energy completely from the generator and strongly retarding the motor or device. Moreover, the dynamic braking circuit of my invention is applicable for automatically bringing the crane motor to a quick slowdown after a manually controlled running operation. The automatic braking system of my invention has numerous applications in series wound motor circuits and the examples I have cited are to be considered in the illustrative sense and not as limiting my invention to the particular applications described.

Where it is desirable to reverse the direction of rotation of the motor 11, it is merely necessary to change the polarity supplied to the motor circuit at the main contactors M1 and M2 as represented in Fig. 4. For the starting condition illustrated in Fig. 4 it is assumed that line L1 is negative while line L2 is positive in the circuit of Fig. 4. Under these conditions unilateral conducting element 15 passes current from line L2 toward line L1 through field winding 18 and through unilateral conductive element 17 through armature 11 to line L1, contactors M1 and M2 being closed. Motor 11 will be driven in a counterclockwise direction. For stopping and braking the motor in the circuit of Fig. 4 the same procedure as heretofore outlined is employed, that is, contactors M1 and M2 and 1A, 2A and 3A are open and contactor DB is closed so that the motor armature 11 generates into the series load through contactors DB, resistance 22, unilateral conductive device 16, field winding 18, and unilateral conductive device 14.

It will be noted that for a starting and running condition for a counterclockwise motor rotation as depicted in Fig. 4, the same unilateral conductive elements 15 and 17 are utilized that were utilized in the stopping and braking condition depicted in Fig. 3 for a clockwise rotation of motor 11. Similarly, in Fig. 5, which shows a stopping and braking condition for counterclockwise rotation of motor armature 11, unilateral conductive elements 14 and 16 are utilized, which are the same elements as are utilized in a starting and running condition for a clockwise direction of the motor as illustrated in Fig. 2. This illustrates the flexibility of the dynamic braking system of my invention, by which direction of rotation may be reversed at the power supply terminals and the braking currents controlled by the series path through the armature 11 and field 18, where the direction of current through the field 18 is always constant regardless of reversal in motor direction.

In Fig. 6 I have shown an alternative arrangement for the system of my invention in which the series wound motor illustrated may be reversed and dynamic braking effected in either direction, where unilateral conductive elements carry current only during the dynamic braking period. I have represented the motor armature 11 as connected through sets of contactors 25, 26, 27 and 28 interposed in series with line L1 and in series with field winding 18 as shown. The armature terminals A1 and A2 connect in this arrangement with the sets of contactors 25 to 28 and with the contactors 29 and 30, as shown. Contactors 29 and 30 connect with opposite terminals Y1 and Y2 leading to the unilateral conductive devices 14, 15, 16, and 17. The field winding 18, in this instance, connects between terminals S1 and S2 where terminal S1 is selectively connectable through either contactor 26 or 27 with brush A1 or brush A2 of the armature 11. The series path established in series with armature 11 and field winding 18 during the period of dynamic braking includes resistance 31. Contactors 25 and 27 coact in passing current through the armature in one direction, while contactors 26 and 28 coact in passing current through armature 11 in the opposite direction. Contactor 30 provides a series path through armature 11 and field winding 18 and includes dissipating resistance 31 and selective unilateral conductive elements 14, 15, 16 and 17 only during the dynamic braking period of operation.

In Fig. 7 I have shown a further modified form of the circuit of my invention in which the series wound motor shown may be reversed and dynamic braking applied in either direction. In this arrangement both the armature 11 and the field winding 18 are controlled with respect to the line L1 and L2 by coacting contactors 32 and 33 and coacting contactors 34 and 35. In this arrangement the elements 14, 15, 16 and 17 of the unilateral conductive circuit 12 are associated with field winding 18 and with resistors 19, 20 and 21, as explained in Fig. 1. The absorption circuit is similar to that shown in Fig. 1, that is, contactor DB and resistance 22 provide a series path around armature 11 and field 18. Dynamic braking is produced in either direction and reversing of the motor is effected by closing sets of contactors 32 and 33 or sets of contactors 34 and 35 alternately.

In Fig. 8 I have illustrated two series wound motors which may be reversed and which may have dynamic braking applied in either direction, and additionally where service or emergency dynamic braking takes place if one motor fails and is cut out. The motors are shown supplied with power from lines L1 and L2. The motors constitute symmetrical installations and in order to show the similarity of the circuits with the circuits heretofore explained I have represented the motor installation 36 as having armature 11 and associated field 18 connected in the unilateral conductive circuit 12 and connected to the resistors 19, 20 and 21 bridged by contactors 1A, 2A and 3A in a manner similar to the arrangement explained in connection with Figs. 1 and 7. I add, however, an additional resistance 37 with shunting contactors 38 associated therewith with a tap 39 common thereto. The second motor installation 40 is similar to the motor installation 36, and in order to readily indicate corresponding parts I have shown the corresponding parts by primed reference characters corresponding to similarly numbered reference characters in the motor installation 36. That is to say, armature 11' corresponds to armature 11; field winding 18' corresponds to field winding 18; unilateral conductive circuit 12' corresponds with unilateral conductive circuit 12; resistors 19', 20', and 21' correspond to resistors 19, 20 and 21; and contactors 1A', 2A', and 3A', correspond to contactors 1A, 2A, and 3A. Additional resistor in the motor installation 40 is shown at 37' corresponding to resistance 37 shunt connected with contactor 39' connected between tap 39' and the end of the bank of resistors. In order to control the operative relation of the two motors 11 and 11' I provide sets of contactors 41 and 42, arranged as shown. The absorption load circuit contains contactor DB and resistances 37 and 37' corresponding to the elements 22, explained in connection with Figs. 1 and 7. Coacting contactors 32 and 33 determine operation of the motors in one direction, while contactors 34 and 35 determine rotation of the motors in the opposite direction. Thus, the motors may be reversed in either direction and dynamic braking is effected in either direction. Emergency dynamic braking takes place if one motor fails and is cut out.

In Fig. 9 I have shown the principles of my invention applied to a variable-voltage or Ward-Leonard system in which generator armature 43 having excitation power supplied to field 44 under control of reversing potentiometer rheostat 45 from line L1—L2 drives the motor 46 of the compound wound type. Motor 46 includes armature 47 and field 48. Field 48 is excited from lines L1—L2. Generator armature 43 drives motor 46 by circuit connections to the armature 47 through the series field 49 arranged in the unilateral conductive circuit 12 containing unilateral conductive elements 14, 15, 16 and 17. While I have shown the invention as applied to a compound wound motor circuit it will be understood that the invention is equally applicable to a series wound motor circuit. Direction of current through the series connected field 49 is maintained the same through the active unilateral conductive paths 14, 15, 16 and 17 independently of the direction of the generated current supplied from generator armature 43. The switch arms 44a and 44b which operate over the reversing potentiometer 45 may be oriented to any position on either side of the equipotential point thus permitting ready reversal of excitation current in the shunt field winding 44 for correspondingly controlling the direction of rotation of motor 46. The use of the circuit of my invention also results in the obtaining of increased torque exerted by motor 46. This provides for greater use of exciting material and in consequence increased economy.

In Fig. 10 I have illustrated by arrows the direction of current through the motor circuit for a starting and running condition. It will be observed that field winding 18 is supplied with current through the unilateral conductive elements 13 and 17 in the direction of the arrows indicated and corresponding to the condition illustrated in Fig. 4. Fig. 11 illustrates the stopping and dynamic braking condition for this same circuit in which current generated by armature 11 passes through unilateral conductive elements 14 and 16 and through the field 18 in the same direction as the current passes in the starting and running condition. This generated current is dissipated to the load 22 through closed contactor DB.

I have found the system of my invention highly effective in rapidly bringing to a stop a motor after the supply current is disconnected therefrom. While my invention is described as having particular application to crane motors, I desire that it be understood that no restrictions either upon the application of the circuit of my invention or the details thereof are intended, other than may be imposed by the scope of the appended claims.

What I claim as new and desire to secure by Letters Patent of the United States is as follows:

1. A motor control system comprising a series wound electric motor including an armature winding and a field winding, a direct current power supply source, a unilaterally conducting device interposed between said field winding and said armature winding, and a separate unilaterally conducting device interposed between said power supply circuit and said field winding circuit and said armature circuit in series for electrically energizing said motor for establishing a starting and running condition, and a dynamic braking circuit including a contactor, an absorbing resistant circuit connectable across one side of said armature winding and the remote terminal of said unilaterally conductive devices, additional unilaterally conducting devices, one of which is interposed between said armature winding circuit and said field winding circuit and the other of which is interposed between said field winding circuit and said absorbing resistant circuit, and means for simultaneously operating said contactor upon interruption of the connection of said power supply circuit with said motor circuit for connecting said absorbing resistant circuit with said armature winding circuit and said field winding circuit, said last mentioned unilaterally conductive devices selectively conducting current in a direction opposite to the direction in which current is directed through said first mentioned unilaterally conductive devices.

2. A motor control system comprising in combination a direct current power supply source, an armature winding circuit, a field winding circuit, a plurality of uindirectionally conducting circuits isolating said field winding circuit with respect to said armature winding circuit, certain of said unidirectionally conducting circuits being electrically connected in series between said field winding circuit, said armature winding circuit and said direct current power supply source for establishing a starting and running condition for said motor, an absorbing circuit connectable across one side of said armature winding circuit and the remote terminal of said unilaterally conducting circuits, and a contactor operative upon the interruption of circuit connections to said direct current power supply source for simultaneously closing the circuit between said armature circuit, said field winding circuit, and said absorbing circuit through certain of the others of said unidirectionally conducting circuits for establishing a braking and retarding condition for the motor.

3. In a control system for a direct current series wound motor, a direct current power supply source, an armature winding circuit, a field winding circuit, sets of unilaterally conductive circuits interposed between said armature winding circuit and said field winding circuit and said power supply source, contactors for controlling the interconnection of said unidirectionally conducting circuits between said armature winding circuit and said field winding circuit and with said direct current power supply source, an absorbing circuit connectable across one side of said armature winding circuit and the remote terminal of said unilaterally conducting circuits, and contactors operative to simultaneously connect said absorbing circuit with said unidirectionally conductive circuits and with said armature winding circuit and said field winding circuit when said first mentioned contactors are opened and interrupt the circuit from said power supply source to said armature winding circuit for establishing a braking and retarding condition of said motor circuit, and separate contactors interposed between said field winding circuit and opposite ends of said armature winding circuit for controlling the clockwise or counterclockwise rotation of the motor intermediate the dynamic braking operations.

4. A reversible series wound motor having a dynamic braking in either direction which includes a direct current power supply circuit, a field winding circuit and an armature winding circuit, a pair of unidirectionally conductive circuits isolating said field winding circuit with respect to said armature winding circuit, an absorbing circuit connectable across one side of said armature winding circuit and the remote terminal of said unilaterally conducting circuits, a contactor in said absorbing circuit, and sets of contactors interposed between said direct current power supply circuit and said armature winding circuit and said field winding circuit, said sets of contactors being operative in alternate relation to the operation of the contactor in said absorbing circuit whereby direct current may be supplied to said armature winding circuit and said field winding circuit in either direction for establishing a clockwise or counterclockwise starting and running condition in said motor circuit said contactors effecting a dynamic braking and retarding condition intermediate said clockwise or counterclockwise starting and running conditions by connection of said absorbing circuit with said armature winding circuit while simultaneously opening the circuit from said direct current power supply circuit to said field winding circuit.

5. A control system for a pair of series wound direct current motors comprising in combination with a direct current power supply source, a pair of direct current motors each including an armature winding and a field winding, sets of unidirectionally conducting circuits associated with each of said field windings and isolating the said field winding with respect to its associated armature winding, an absorbing circuit comprising two branches, contactors for selectively controlling the connection of said power supply source to either or both of said motor circuits through said unidirectionally conducting circuits for the selective operation of one or both of said motors in a clockwise or counterclockwise direction sets of contactors for selectively connecting either or both of the branches of said absorbing circuit with either or both of said motor circuits for dynamically braking either or both of said motor circuits, simultaneously with the opening of the contactors between the power supply source and the motor circuits.

FREDERICK Y. GREPE.

REFERENCES CITED

The following references are of record in the file of this patent:

UNITED STATES PATENTS

| Number | Name | Date |
| --- | --- | --- |
| 748,635 | Muschenheim et al. | Jan. 5, 1904 |
| 1,448,381 | Bouton | Mar. 13, 1923 |
| 1,490,228 | Parks | Apr. 15, 1924 |
| 1,805,160 | Bivens | May 12, 1931 |
| 1,805,167 | Fitzgerald | May 12, 1931 |
| 1,933,231 | Stevens | Oct. 31, 1933 |